United States Patent
Moretz et al.

(10) Patent No.: US 12,196,375 B2
(45) Date of Patent: Jan. 14, 2025

(54) FULLY PIGGABLE DIFFERENTIAL PRESSURE ACTUATED VALVE WITH VARIABLE RESTRICTOR

(71) Applicant: Safe Crossings, LLC, Jackson, MI (US)

(72) Inventors: R. Dale Moretz, Jackson, MI (US); Derek J. Moretz, Seattle, WA (US)

(73) Assignee: Safe Crossings, LLC, Jackson, MI (US)

( * ) Notice: Subject to any disclaimer, the term of this patent is extended or adjusted under 35 U.S.C. 154(b) by 0 days.

(21) Appl. No.: 18/380,944

(22) Filed: Oct. 17, 2023

(65) Prior Publication Data

US 2024/0125438 A1    Apr. 18, 2024

Related U.S. Application Data

(60) Provisional application No. 63/416,749, filed on Oct. 17, 2022.

(51) Int. Cl.
*F17D 5/06* (2006.01)
*F16K 1/20* (2006.01)
(Continued)

(52) U.S. Cl.
CPC .................. *F17D 5/06* (2013.01); *F16K 1/20* (2013.01); *F16K 3/0254* (2013.01); *F16K 17/28* (2013.01);
(Continued)

(58) Field of Classification Search
CPC ..... F17D 5/06; F17D 5/02; F16K 1/20; F16K 3/0254; F16K 17/28; F16K 17/32; F16K 31/54
(Continued)

(56) References Cited

U.S. PATENT DOCUMENTS 2,266,421 A * 12/1941 Griffith ................. F16K 1/2028
                                                            137/527
2,381,447 A *  8/1945 Hedene ................... F16K 17/32
                                                            137/462
(Continued)

FOREIGN PATENT DOCUMENTS

CN        104930211 A    9/2015
EP          2362123 A1    8/2011

*Primary Examiner* — Minh Q Le
(74) *Attorney, Agent, or Firm* — Howard & Howard Attorneys PLLC

(57) ABSTRACT

A valve system for controlling a flow of material includes a pipeline including an upstream portion a downstream portion. The system includes a variable flow restrictor configured for providing a restrictive orifice within the pipeline and creating a pressure differential in the flow of material high-pressure material in the upstream portion and low-pressure material in the downstream portion. The system includes a low-pressure tube connected to the downstream portion and a low-pressure chamber connected to the tube and receiving low-pressure material. The chamber includes a secondary flapper configured for selectively blocking the tube. The system includes a primary flapper disposed between the upstream portion and the low-pressure chamber and configured to be disposed in one of a first and second position. The flapper is held in the first position by the pressure differential. The flapper moves to the second position blocking the pipeline when a leak occurs.

20 Claims, 10 Drawing Sheets

(51) Int. Cl.
  *F16K 3/02* (2006.01)
  *F16K 17/28* (2006.01)
  *F16K 17/32* (2006.01)
  *F16K 31/54* (2006.01)
  *F17D 5/02* (2006.01)

(52) U.S. Cl.
  CPC .............. *F16K 17/32* (2013.01); *F16K 31/54* (2013.01); *F17D 5/02* (2013.01)

(58) Field of Classification Search
  USPC ......................................................... 137/247
  See application file for complete search history.

(56) References Cited

U.S. PATENT DOCUMENTS

| | | | | |
|---|---|---|---|---|
| 2,673,707 A | * | 3/1954 | McRae | F16K 17/40 137/75 |
| 3,654,962 A | * | 4/1972 | Fredd | F16K 35/00 251/327 |
| 5,618,027 A | * | 4/1997 | Nevrekar | F16K 3/0254 251/302 |
| 7,273,062 B1 | * | 9/2007 | Stender, Jr. | F16K 17/32 137/460 |
| 10,641,405 B2 | | 5/2020 | Moretz et al. | |
| 10,865,946 B2 | | 12/2020 | Moretz | |
| 11,454,353 B2 | | 9/2022 | Moretz | |
| 11,835,184 B2 | | 12/2023 | Moretz | |
| 2005/0109968 A1 | * | 5/2005 | Weiss | F16K 3/06 251/129.21 |
| 2005/0211941 A1 | * | 9/2005 | LaVergne | F16K 31/163 251/250 |
| 2014/0345716 A1 | * | 11/2014 | Curinier | F16L 55/1018 137/527 |
| 2019/0346334 A1 | * | 11/2019 | Ocalan | G01M 3/005 |
| 2021/0341955 A1 | * | 11/2021 | Zhang | F16K 3/0254 |

\* cited by examiner

FULLY PIGGABLE DIFFERENTIAL PRESSURE ACTUATED VALVE WITH VARIABLE RESTRICTOR

CROSS-REFERENCE TO RELATED APPLICATIONS

The subject patent application claims priority to, and all the benefits of, United States Provisional Patent Application No. 63/416,749, filed on Oct. 17, 2022, the entire contents of which are incorporated by reference herein.

FIELD OF INVENTION

The fully piggable differential actuated valve is related to valves and similar components for pipelines. A pipeline may include a constant or minimum diameter passing pigs (instruments that are used to clean, separate materials in, or inspect pipelines) used for inspecting pipelines.

BACKGROUND

Pipelines for transporting oil and other materials are used to efficiently and economically carry materials over long distances, as well as to distribute those products on a wholesale and retail basis. Valves may be used to control or stop the flow of these materials. Pipelines may transport fluids that are preferable to retain within the pipeline. Petroleum products, if leaked or spilled from the pipeline, may have undesirable effects upon the environment, flora, and fauna in the area. Pipelines may leak or rupture either because of age and deterioration or because of damage from natural or human causes.

SUMMARY

A system for detecting leaks and stopping a flow of materials through a pipeline in the event of a rupture is desirable. A system that may automatically cease or stop a flow of material through a pipeline upstream of a leak or rupture may prevent environmental damage caused by uncontained material. Further, such a system may be in compliance with a pigging operation, wherein devices used for cleaning, separating materials, and internal pipeline inspection may be passed through the pipeline.

A system including a differential pressure actuated valve configured to control a flow of material through a pipeline is provided. The system includes the pipeline configured for transporting the flow of material and including an upstream portion receiving the flow of material into the pipeline and a downstream portion wherein the flow of material flows from the upstream portion, through a variable flow restrictor, and into the downstream portion. The system further includes the variable flow restrictor configured to selectively operate in one of a plurality of states of varying resistance. The variable flow restrictor is further configured for providing a restrictive orifice within the pipeline and creating a pressure differential in the flow of material across the variable flow restrictor including relatively high-pressure material in the upstream portion and relatively low-pressure material in the downstream portion. The relatively low-pressure material includes a pressure less than an ambient pressure outside of the pipeline. The system further includes a low-pressure tube connected to the downstream portion and receiving a portion of the relatively low-pressure material and a low-pressure chamber connected to the low-pressure tube and receiving the portion of the relatively low-pressure material. The low-pressure tube includes an opening within the low-pressure chamber. The low-pressure chamber includes a secondary flapper configured for selectively blocking the opening. The system further includes a primary flapper including a hinge enabling the primary flapper to move between a first position and a second position, disposed between the upstream portion and the low-pressure chamber, and configured to be disposed in one of the first position and the second position. In the first position, the primary flapper separates the relatively high-pressure material in the upstream portion from the portion of the relatively low-pressure material in the low-pressure chamber, is held in the first position by the pressure differential, and enables the flow of material to flow through the pipeline. In the second position, the primary flapper spans an internal diameter of the pipeline and blocks the flow of material through the pipeline, and wherein the primary flapper is configured to move to the second position when a leak in the downstream portion causes air or water at the ambient pressure to enter the downstream portion and reduce the pressure differential.

In some embodiments, the variable flow restrictor being configured to selectively operate in one of the plurality of states of varying resistance includes the variable flow restrictor being configured to operate in one of a fully open state and a partially restricted state. The variable flow restrictor is configured for providing the restrictive orifice.

In some embodiments, the primary flapper, when the primary flapper is in the first position, is configured for including a shape similar to the pipeline.

In some embodiments, the variable flow restrictor being in the fully open state and the primary flapper, being in the first position, are configured for enabling a pigging device configured for traveling through the pipeline to pass through the system.

In some embodiments, the system further includes a latch device configured to lock the primary flapper in the first position while the variable flow restrictor is in the fully open state.

In some embodiments, the system further includes a flapper control cylinder configured to provide a calibratable force upon the primary flapper.

In some embodiments, the variable flow restrictor includes a flow restrictor housing connected to the pipeline. The flow restrictor housing is leak-proof and is configured to prevent the air or the water at the ambient pressure from entering the pipeline or the flow of material from escaping from the pipeline. The variable flow restrictor further includes a restrictor panel including a through-hole. The restrictor panel is movable between a plurality of positions and is configured to selectively provide variable flow resistance based upon an alignment of the through-hole with the pipeline resulting from the plurality of positions.

In some embodiments, the restrictor panel includes a plurality of tooth-shaped features. The variable flow restrictor further includes a motor and a pinion gear, the motor provides torque to the pinion gear, and the pinion gear engages with the tooth-shaped features and moves the restrictor panel between the plurality of positions.

In some embodiments, the through-hole includes a teardrop-shaped through-hole opening.

In some embodiments, the restrictor panel includes a portion without the through-hole. The variable flow restrictor is configured for ceasing the flow of material through the pipeline by aligning the portion without the through-hole with the pipeline.

In some embodiments, the primary flapper includes a cam extending upwardly from the primary flapper. The cam is configured to keep the secondary flapper from blocking the opening when the primary flapper is in the first position.

In some embodiments, the primary flapper includes a flexible wiper seal disposed around a perimeter of the primary flapper. When the primary flapper is in the first position, the flexible wiper seal is configured for preventing the relatively high-pressure material in the upstream portion from leaking past the primary flapper into the low-pressure chamber. When the primary flapper is in the second position, the flexible wiper seal is configured for sealing the primary flapper to an inner diameter of the pipeline.

In some embodiments, the first position is an up position, and the second position is a fallen position.

According to one alternative embodiment, a system including a differential pressure actuated valve configured to control a flow of material through a pipeline and to enable a pigging device to pass through the system is provided. The system includes the pipeline configured for transporting the flow of material and including an upstream portion receiving the flow of material into the pipeline and a downstream portion wherein the flow of material flows from the upstream portion, through a variable flow restrictor, and into the downstream portion. The system further includes the variable flow restrictor configured to selectively operate in one of a fully open state and a partially restricted state. The variable flow restrictor is further configured for providing a restrictive orifice within the pipeline and creating a pressure differential in the flow of material across the variable flow restrictor including relatively high-pressure material in the upstream portion and relatively low-pressure material in the downstream portion. The relatively low-pressure material includes a pressure less than an ambient pressure outside of the pipeline. The system further includes a low-pressure tube connected to the downstream portion and receiving a portion of the relatively low-pressure material and a low-pressure chamber connected to the low-pressure tube and receiving the portion of the relatively low-pressure material. The low-pressure tube includes an opening within the low-pressure chamber. The low-pressure chamber includes a secondary flapper configured for selectively blocking the opening. The system further includes a primary flapper including a hinge enabling the primary flapper to move between an up position and a fallen position, disposed between the upstream portion and the low-pressure chamber, and configured to be disposed in one of the up position and the fallen position. In the up position, the primary flapper separates the relatively high-pressure material in the upstream portion from the portion of the relatively low-pressure material in the low-pressure chamber, is held in the up position by the pressure differential, and enables the flow of material to flow through the pipeline. The primary flapper, when the primary flapper is in the up position, is configured for including a shape similar to the pipeline. In the fallen position, the primary flapper spans an internal diameter of the pipeline and blocks the flow of material through the pipeline. The primary flapper is configured to move to the fallen position when a leak in the downstream portion causes air or water at the ambient pressure to enter the downstream portion and reduce the pressure differential; and wherein the variable flow restrictor being in the fully open state and the primary flapper, being in the up position, are configured for enabling the pigging device configured for traveling through the pipeline to pass through the system.

In some embodiments, the variable flow restrictor is configured to operate in a plurality of partially restricted states to enable adjustment of the pressure differential.

In some embodiments, the system further includes a latch device configured to lock the primary flapper in the up position while the variable flow restrictor is in the fully open state.

In some embodiments, the system further includes a flapper control cylinder configured to provide a calibratable force upon the primary flapper.

In some embodiments, the variable flow restrictor includes a flow restrictor housing connected to the pipeline. The flow restrictor housing is leak-proof and is configured to prevent the air or the water at the ambient pressure from entering the pipeline or the flow of material from escaping from the pipeline. The variable flow restrictor further includes a restrictor panel including a through-hole. The restrictor panel is movable between a plurality of positions and is configured to selectively provide variable flow resistance based upon an alignment of the through-hole with the pipeline resulting from the plurality of positions.

In some embodiments, the through-hole includes a teardrop-shaped through-hole opening.

In some embodiments, the restrictor panel includes a portion without the through-hole. The variable flow restrictor is configured for ceasing the flow of material through the pipeline by aligning the portion without the through-hole with the pipeline.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

Advantages of the present disclosure will be readily appreciated as the same becomes better understood by reference to the following detailed description when considered in connection with the accompanying drawings.

DETAILED DESCRIPTION

Figure 1A:
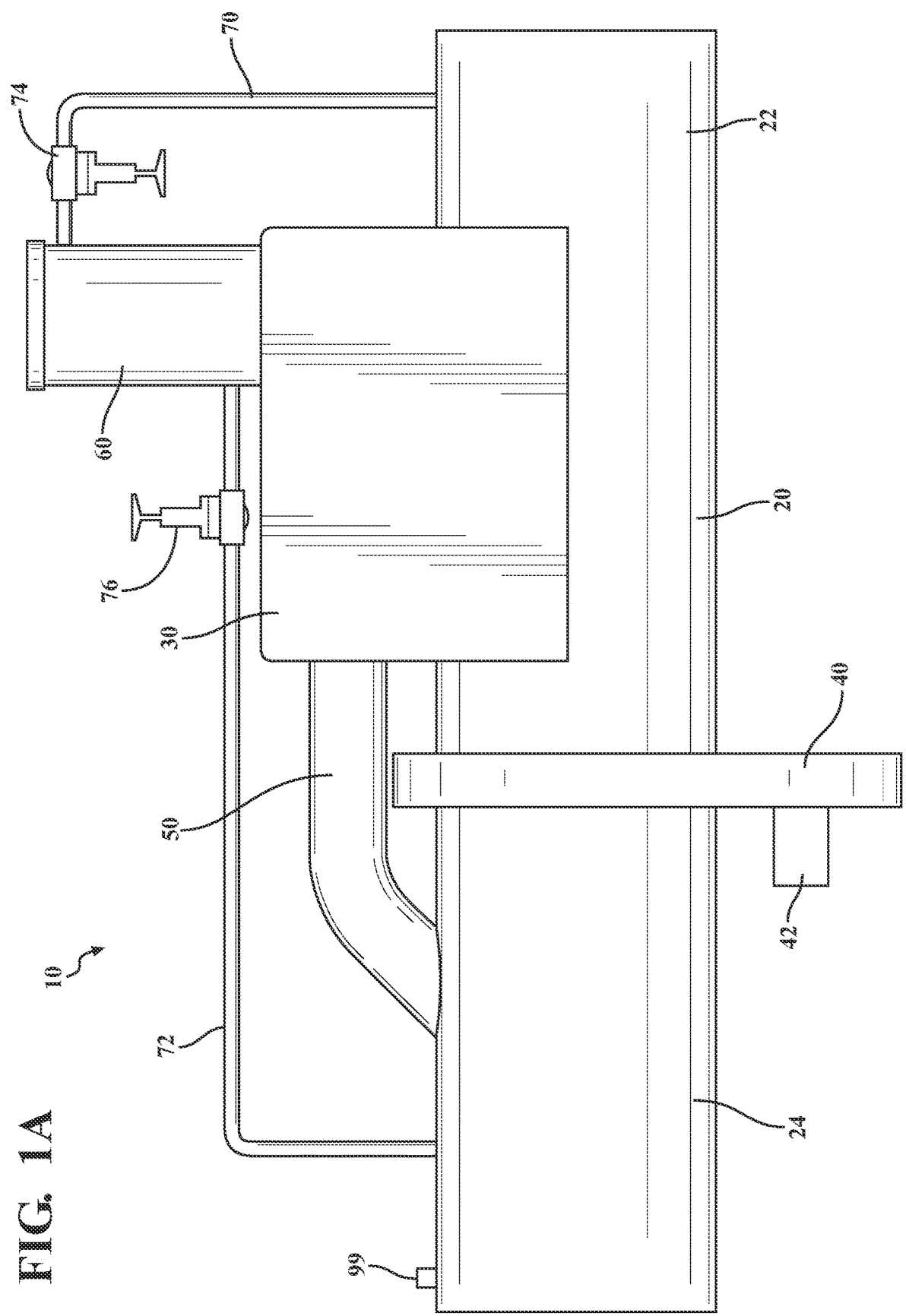
FIG. 1A schematically illustrates a system including a fully piggable differential pressure actuated valve with a variable flow restrictor in side view, in accordance with the present disclosure.

A pipeline transporting oil or other materials may traverse an area where uncontained oil or other materials may be undesirable. A fully piggable differential pressure actuated valve is provided which is configured to automatically close in the event a leak or rupture takes place downstream of the valve. A valve similarly described for automatic activation in the occurrence of a downstream leak is provided in commonly assigned U.S. Pat. No. 10,641,405, which is hereby incorporated in its entirety by reference. Further, a method for preventing spills from pipeline failures is provided in commonly assigned U.S. Pat. No. 11,454,353, which is hereby incorporated in its entirety by reference.

Flow through a tube or pipe incurs flow resistance upon material flowing through the tube. The resistance depends upon a geometry of the tube, for example, with a constrictive orifice or a step-down in diameter of the tube causing a significant flow resistance in the tube. Pressure of the material flowing through the tube decreases incrementally through a portion of tube in proportion to or as a function of flow resistance. Material flowing through a constrictive orifice experiences a decrease in pressure.

A flow restrictor within the disclosed system may be utilized to decrease an internal pressure within the pipeline downstream of the flow restrictor to an internal pressure below ambient pressure outside of the pipeline. The flow restrictor may be a variable flow restrictor. If the pipeline remains intact and substantially airtight, the internal pressure downstream of the flow restrictor may remain below ambient pressure. If the pipeline does not remain intact due to a leak or a rupture through which material may escape from the pipeline, air or water from outside the pipeline may rush into the pipeline and raise the pressure within the pipeline to or near to an ambient pressure. Internal pressure within the pipeline downstream of the flow restrictor may be utilized to control a valve between an open condition or open state, wherein the pipeline is determined to be intact and not leaking material, and a closed condition or closed state, wherein the pipeline is determined to be leaking or ruptured and wherein the flow of material is to be ceased or stopped.

A number of configurations utilizing a measure of the internal pressure of a portion of the pipeline downstream of the flow restrictor are envisioned. In one embodiment, a pressure differential between a portion of the pipeline upstream of the flow restrictor and the portion of the pipeline downstream of the flow restrictor may be utilized to automatically actuate the valve. The valve may be configured to include a primary flapper or a door that may be held in place by the pressure differential between the portion of the pipeline upstream of the flow restrictor and the portion of the pipeline downstream of the flow restrictor when the pipeline is intact and material is flowing through the pipeline. This primary flapper held in place by the pressure differential may be in an up position enabling material to flow past the primary flapper corresponding to the system operating in an operational state. The primary flapper may be configured to fall or displace when the internal pressure in the portion of the pipeline downstream of the flow restrictor increases, as would occur after a rupture. The primary flapper after falling or displacing from its initial position, may partially or wholly block the flow of the material through the pipeline.

In order for a pipeline to be considered piggable, capable of enabling a device such as a robotic cleaning, separating, inspecting device to move through the pipeline, a pipeline standard diameter may be adopted. The robot may be configured to pass through the pipeline so long as the pipeline maintains the pipeline standard diameter.

The disclosed system may enable pigging of the associated pipeline by including features that maintain the pipeline standard diameter. With regard to the primary flapper, the primary flapper may be configured to imitate a portion of the pipeline wall when the primary flapper is in the initial or up position corresponding to the system being in the operational state. The primary flapper may include an arcuate section conforming to the pipeline standard diameter. The primary flapper may be configured to include a hinge which enables the arcuate section to rotate downward or fall into the interior of the pipeline into a fallen position. The outer perimeter of the primary flapper may be configured to substantially conform to the interior of the pipeline at some angle relative to the hinge so as to partially or wholly block flow of material through the pipeline when in the fallen position. In one embodiment, a perimeter of the primary flapper may include a flexible wiper gasket configured to seal against the mating pipeline surfaces proximate to the primary flapper in the initial or up position, in the fallen position or blocking position, or both.

The flow restrictor includes an ability to partially restrict flow past the flow restrictor. In order to be piggable, the flow restrictor may be configured to alternate between a partially restricted position, wherein the flow restrictor acts as a constrictive orifice blocking a portion of flow through the flow restrictor, and a fully open position, wherein the pipeline standard diameter is protected through the flow restrictor. This variable restriction may be accomplished by a number of flow restrictor embodiments. In one embodiment, a flow restrictor panel including a teardrop shape may be utilized. The flow restrictor panel may be movable, such that different portions of the teardrop shape may transit or span the interior of the pipeline. At one end or one portion of the teardrop shape, a round shape may exist that, when the round shape is exposed to the interior of the pipeline, the flow restrictor does not project any material into the interior of the pipeline. This round shape may include the pipeline standard diameter or may be larger than the pipeline standard diameter. When a flow restriction corresponding to the operational state of the system is desirable, for example, to create an internal pressure downstream of the flow restrictor less than an ambient pressure, the flow restrictor panel may be moved such that a different portion of the teardrop shape is exposed to the interior of the pipeline. This different portion of the teardrop shape may project panel material into the interior of the pipeline and may create a step down in diameter of the pipeline at the flow restrictor, thereby causing the flow restrictor panel to act as a constrictive orifice. Shapes other than a teardrop may be utilized. For example, a series of holes of varying diameters may be formed in the flow restrictor panel. However, the teardrop shape is advantageous in that a variety of flow restriction values or a variety of pressure drops across the flow restrictor may be controlled based upon which portion of the teardrop shape is exposed to the interior of the pipeline. Further, the teardrop shape is advantageous in that it is space efficient. The flow restrictor panel including a plurality of candidate holes to expose to the interior of the pipeline could be quite or prohibitively large.

The flow restrictor panel may include a shape cut-out or formed through the panel to enable a variable amount of material to flow past the flow restrictor. The flow restrictor panel may further include a portion of the panel including solid material without a through-hole. When this portion of the panel including the solid material is exposed within the pipeline, the flow of material through the pipeline may be ceased or stopped. By cooperative use of the primary flapper and the variable flow restrictor, the flow of material through the pipeline may be ceased through redundant control. A malfunction of either the primary flapper or the flow restrictor panel may be compensated for by operation of the remaining one of the primary flapper or the flow restrictor panel.

Differential pressure may be utilized to hold the primary flapper in the initial or up position. When no material is flowing through the pipeline, the flow restrictor does not create lower-than-ambient internal pressure in the portion of the pipeline downstream of the flow restrictor. A latch device may be utilized to hold the primary flapper in the up position. Such a condition may occur when the device is first set up, when material stops flowing through the pipeline for any reason, when the pipeline is partially or fully emptied, or when flow ceases to enable a pigging device to travel through the pipeline.

The system may include a computerized controller configured to engage the latch device and disengage the latch device at appropriate times. For example, a human interface device may enable a user to input a shut-down process wherein material will subsequently be ceased from flowing through the pipeline. The user alternatively may initiate a pigging operation state. In another example, a plurality of pressure sensors may be located along the pipeline. The pressure sensors may be used to diagnose a condition where the material remains contained and where flow of the material is slowing or has ceased. In these examples, permitting the primary flapper to fall would not be advantageous, as no leak is present in the pipeline, and the primary flapper may desirably remain in the up position despite the pressure differential across the flow restrictor lessening or becoming zero. In one embodiment, wherein the pipeline is operational, the latch device may be maintained in a disengaged state, and wherein the pipeline is stopped or wherein a pigging device is being utilized, the latch device may be maintained in an engaged state.

The flow restrictor panel may be contained within a flow restrictor housing to permit the flow restrictor panel to move relative to the pipeline while maintaining an airtight or sealed pipeline. The flow restrictor housing may include an internal cavity large enough for the flow restrictor panel to move between a plurality of positions enabling variable flow resistance in the pipeline as material flows past the flow restrictor panel. In one embodiment, the flow restrictor panel may be moved between positions by a rack and pinion system, wherein the flow restrictor panel may include a line or series of tooth-shaped features, and an electric motor may be utilized to turn a round gear enmeshed with the tooth-shaped features to cause the flow restrictor panel to translate. In one embodiment, the electric motor may be encapsulated within the flow restrictor housing. In other embodiments, the flow restrictor panel may be moved through use of hydraulics, pneumatics, magnetics, or other means.

In one embodiment, a downstream pump may aid in creating the low pressure downstream of the flow restrictor. The flow restrictor and the downstream pump may be utilized to particularly protect a sensitive area, such as a wetland or body of water through which the pipeline is routed.

The primary flapper of the disclosed system may act as a differential pressure actuated valve providing protection from leaks, ceasing or stopping the flow without the need for sensors, signaling or external power. Based solely on the pressure differential across the flow restrictor, the primary flapper may be maintained in an up position, permitting material to flow past the primary flapper, until the pressure differential degrades, indicating a leak downstream of the primary flapper, thereby causing the primary flapper to fall and block the flow of the material past the primary flapper and towards the leak.

The primary flapper provides this leak mitigation functionality without the use of sensors or computerized control. By additionally utilizing sensors and signaling to monitor conditions in the pipeline, additional functionality such as precise control of the flow restrictor panel may be added to the system. This added capability enables passing pigs that are used for cleaning, separating materials, or inspecting pipelines without interference. This added capacity enables locking the primary flapper in the up position while relative negative pressure is not available as a result of fully opening the flow restrictor panel or as a result of variable operation of the downstream pump. This added capacity enables adjustment of the primary flapper sensitivity, for example, compensating primary flapper operation for variable flow rates of the material within the pipeline. For example, if flow past the flow restrictor is temporarily reduced, for example, corresponding to less material being pumped through the pipeline per unit time, the pressure differential across the flow restrictor resulting from the flow resistance of the orifice will decrease, and the primary flapper may be controlled to not fall due to the reduced pressure differential. Such control may be achieved by locking the latch device, changing a setting of the variable flow restrictor to increase the pressure differential, reducing a force applied by the flapper control cylinder upon the flapper, or a combination of these actions.

Throughout the disclosure, the primary flapper is described as being in an up position or a fallen position. It will be appreciated that, while gravity may aid the primary flapper and the secondary flapper in being activated from initial positions and blocking their respective flows of relatively high-pressure material, a vertical orientation of the system is not necessary for proper operation of the disclosed valve. For example, if the primary flapper were initially aligned to a side or a bottom of the pipeline, the flapper control cylinder may be calibrated to provide additional force upon the flapper to compensate for the effect of gravity. In one embodiment, the up position may be described as a first position, and the fallen position may be described as a second position.

Throughout the disclosure, the relatively low-pressure material is described as being at a pressure less than an ambient pressure outside of the pipeline. This ambient pressure may, when the pipeline exists surrounded by air, an ambient air pressure. The pipeline may exist under water. In such an instance, the ambient pressure outside of the pipeline may describe the water pressure at the depth of the pipeline. In some instances, a pipeline may traverse a range of depths of water, for example, with the pipeline entering the water at the shore and following a contour of a bottom of the water. In order to prevent a leak from the pipeline, the relatively low-pressure material may be controlled to be lower than a lowest ambient pressure outside of the pipeline.

FIG. 1A schematically illustrates a system 10 including a fully piggable differential pressure actuated valve with a variable flow restrictor in side view. The system 10 is illustrated including a pipeline 20, a low-pressure chamber 30, a flow restrictor housing 40, a low-pressure tube 50, and a flapper control cylinder 60. The pipeline 20 is illustrated including an upstream portion 22 and a downstream portion 24. During an operational state of the system 10, a flow restrictor panel within the flow restrictor housing 40 interacts with material flowing through the pipeline 20 to create a pressure drop in the material across the flow restrictor panel or a pressure differential across the flow restrictor panel. The flow restrictor housing 40 is sealed and connected to the pipeline 20, such that material may not leak from the flow restrictor housing 40. An electric motor 42 is illustrated connected to the flow restrictor housing 40 configured for moving the flow restrictor panel within the flow restrictor housing 40. The motor 42 may be encapsulated within the flow restrictor housing 40.

The low-pressure tube 50 connects with the pipeline 20 in the downstream portion 24 of the pipeline 20. The low-pressure tube 50 provides relatively low pressure material from the downstream portion 24 as compared with relatively high pressure material within the upstream portion 22. Throughout the disclosure, high-pressure material within the system 10 may be described as relatively high-pressure material present within the upstream portion 22 as compared to relatively low-pressure material within the downstream portion 24 when the system 10 is in an operational state. Similarly, throughout the disclosure, low-pressure material within the system 10 may be described as relatively low-pressure material as may be present within the downstream portion 24 as compared with the relatively high-pressure material within the upstream portion 22 when the system 10 is in an operational state. Throughout the disclosure, upstream refers to a portion of the pipeline 20 through which material flows towards the flow restrictor panel. Throughout the disclosure, downstream refers to a portion of the pipeline 20 through which material flows away from the flow restrictor panel after having passed the flow restrictor panel.

The flapper control cylinder 60 may be utilized to provide a calibrated force upon a primary flapper within the low-pressure chamber 30. Tap line 70 provides high pressure material from the upstream portion 22 to the flapper control cylinder 60. The high-pressure material may flow through the flapper control cylinder 60 and exit through exit line 72 into the downstream portion 24. The operation of the flapper control cylinder 60 may be calibrated through manually or automatically controlled valves. The system 10 is illustrated including a first manual valve 74 and a second manual valve 76. The system 10 is further illustrated including a pressure sensor 99. The position of the sensor 99 is exemplary, and a plurality of sensors 99 may be present in the system 10 in order to monitor and diagnose internal pressure at locations within the system 10.

Figure 1B:
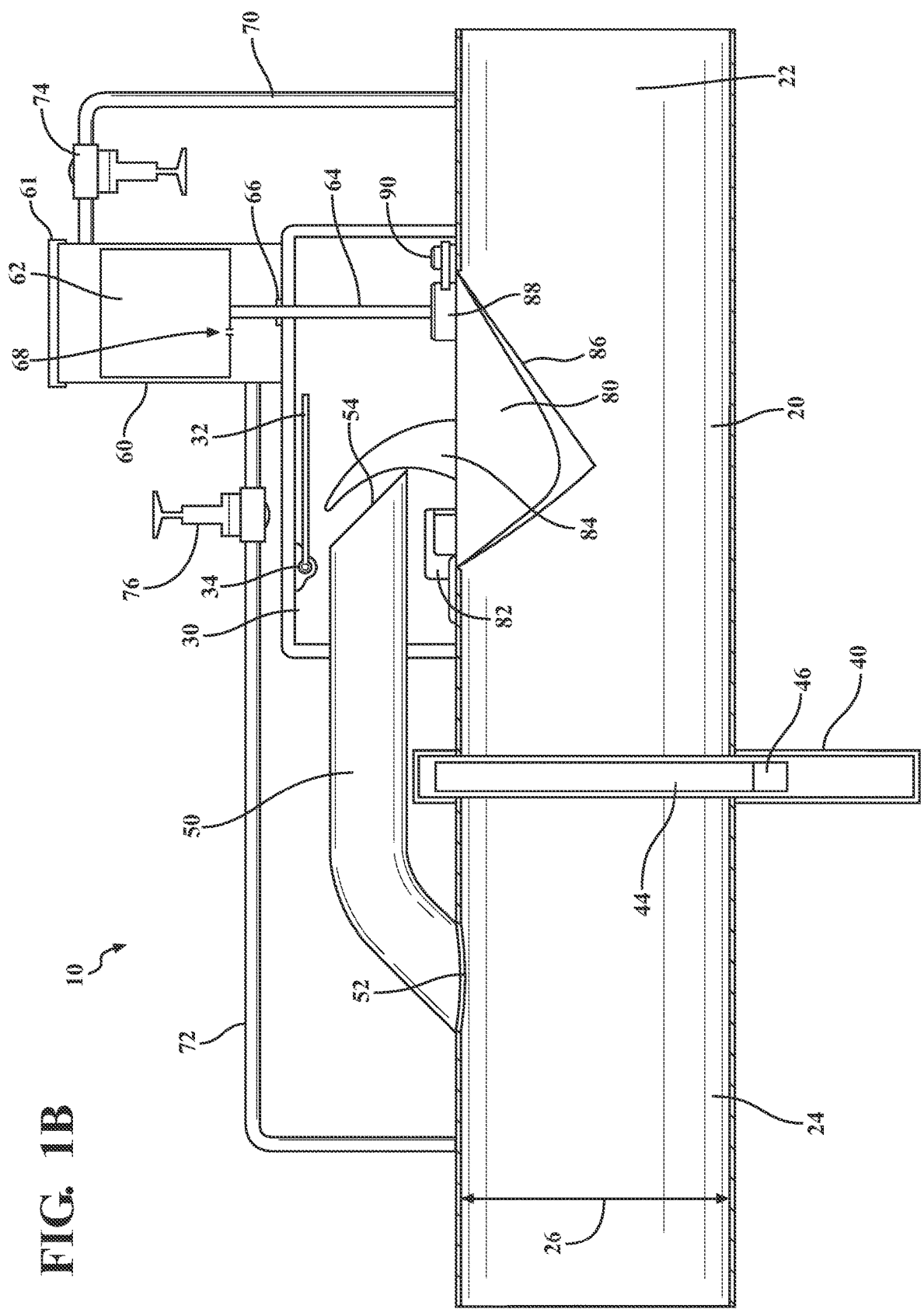
FIG. 1B schematically illustrates the system of FIG. 1A in cross-section, with the system in an operational state, in accordance with the present disclosure.
Figure 1C:
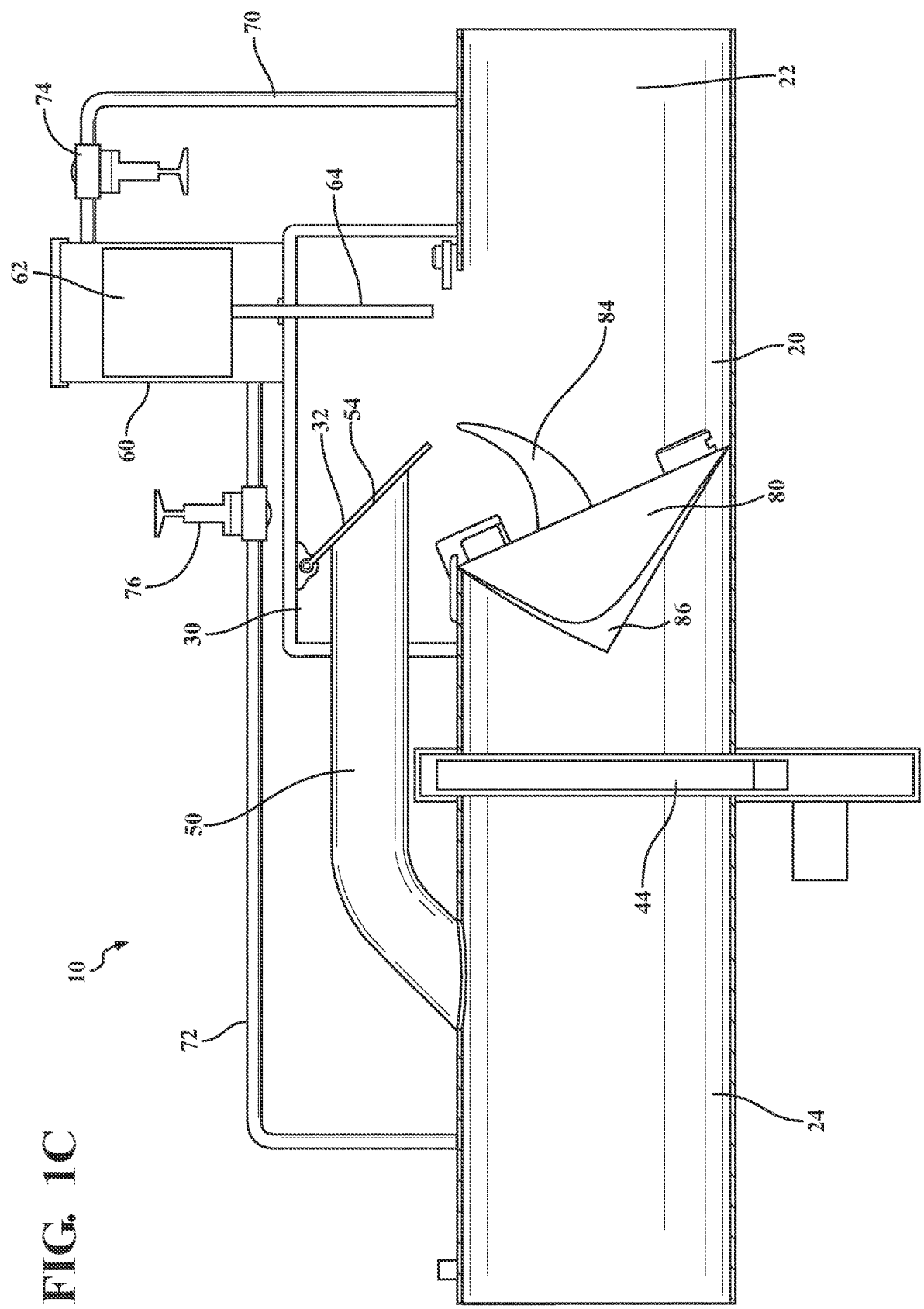
FIG. 1C schematically illustrates the system of FIG. 1A in cross-section, with the system in a fault state, in accordance with the present disclosure.

FIGS. 1B and 1C schematically illustrate the system 10 of FIG. 1A in side view in cross-section. The system 10 is illustrated including the pipeline 20, the low-pressure chamber 30, the flow restrictor housing 40, the low-pressure tube 50, and the flapper control cylinder 60. The pipeline 20 is illustrated including the upstream portion 22 and the downstream portion 24.

A flow restrictor panel 44 is illustrated within the flow restrictor housing 40 configured to interact with material flowing through the pipeline 20 to create a pressure drop in the material across or past the flow restrictor panel 44 or a pressure differential across the flow restrictor panel 44. The electric motor 42 of FIG. 1A provides torque to a pinion gear positioned to engage with tooth-shaped features 46 along a bottom edge of the flow restrictor panel 44.

The low-pressure tube 50 connects with the pipeline 20 in the downstream portion 24 of the pipeline 20. The low-pressure tube 50 provides relatively low-pressure material from the downstream portion 24 as compared with relatively high-pressure material within the upstream portion 22 to create a low-pressure condition within the low-pressure chamber 30. The low-pressure condition within the low-pressure chamber 30 provides a pressure differential upon a primary flapper 80 as compared to high-pressure material below the primary flapper 80. This pressure differential results in a net upward force upon the primary flapper 80. As long as this pressure differential is in place and pushes upwards upon the primary flapper 80, the primary flapper 80 may remain in the up position illustrated in FIG. 1B.

The primary flapper 80 is illustrated including hinge 82 configured to enable the primary flapper 80 to pivot into a down position illustrated in FIG. 1C corresponding to a fault state in the system 10. The primary flapper 80 is further illustrated including a cam 84 configured to interact with secondary flapper 32 within the low-pressure chamber 30. The primary flapper 80 is further illustrated including a flexible wiper gasket 86 disposed around a perimeter of the primary flapper 80. The primary flapper 80 is further illustrated including a latch-force receiver 88 disposed upon a top side of the primary flapper 80.

The flapper control cylinder 60 is illustrated including a piston 62 receiving high-pressure material through the tap line 70. The piston 62 acts upon a probe 64 to provide force upon the latch-force receiver 88 upon the primary flapper 80. The force applied to the latch-force receiver 88 may be calibrated through operation of valves 74,76. An O-ring 66 prevents material within the flapper control cylinder 60 from entering the low-pressure chamber 30. An orifice 68 including a small hole in a bottom of the piston 62 may allow a small amount of the high-pressure material to leak past the piston 62. This "controlled leak" allows precise control of the valve's sensitivity, allowing adjustment to cause closure at various levels of leakage in the pipeline downstream of the restrictor. Material flowing through orifice 68 may exit flapper control cylinder 60 through exit line 72.

In FIG. 1B, the primary flapper 80 is illustrated in the up position. This up position may be maintained by the pressure differential across the primary flapper 80. The up position may additionally or alternatively be maintained by latch device 90 engaging with the latch-force receiver 88 upon the primary flapper 80. When the primary flapper 80 is in the up position, as is illustrated in FIG. 1B, the cam 84 maintains the secondary flapper 32 in an open position prevents the secondary flapper 32 from lowering into a closed position. The secondary flapper 32 includes a hinge 34 and is configured to block material entering the low-pressure chamber 30 from entering and flowing through the low-pressure tube 50 through opening 54 when the secondary flapper is in the closed position, as is illustrated in FIG. 1C.

As is illustrated in FIG. 1B, the primary flapper 80 in the up position seals the high-pressure material in the upstream portion 22 from flowing into the low-pressure chamber 30. The flexible wiper gasket is configured to aid in sealing the primary flapper 80 to neighboring surfaces of the pipeline 20.

The inner diameter 26 of the pipeline 20 is illustrated. In some embodiments, in order to be piggable, the pipeline 20 may be maintained to include the inner diameter 26 fully open and free of structural obstacles throughout the pipeline 20. In some embodiments, the primary flapper 80 and the flow restrictor panel 44 may each be selectively disposed to maintain the inner diameter of 26 throughout the system 10.

As is illustrated in FIG. 1C, the primary flapper 80 is configured to lower into the down position and seal against an inside surface of the pipeline 20. The flexible wiper gasket 86 is configured to aid in sealing the primary flapper 80 to the inside surface of the pipeline 20.

As is illustrated in FIG. 1B, when the primary flapper 80 is in the up position, material may flow past the primary flapper 80. As is illustrated in FIG. 1C, when the primary flapper 80 is in the down position and when the secondary flapper 32 is in the closed position, material is blocked from flowing past the primary flapper 80 and the secondary flapper 32.

The piston 62 within the flapper control cylinder 60 provides a constant, calibrated force upon the primary flapper 80. This calibrated force is set to distinguish or discriminate between normal variations in the pressure differential across the primary flapper 80 and a significant loss in or lessening of the pressure differential across the primary flapper 80 indicative of a rupture or leak in the pipeline 20 downstream of the system 10. A control system or a user manually adjusting valve 74 and/or valve 76 may adjust the calibrated force.

Figure 2A:
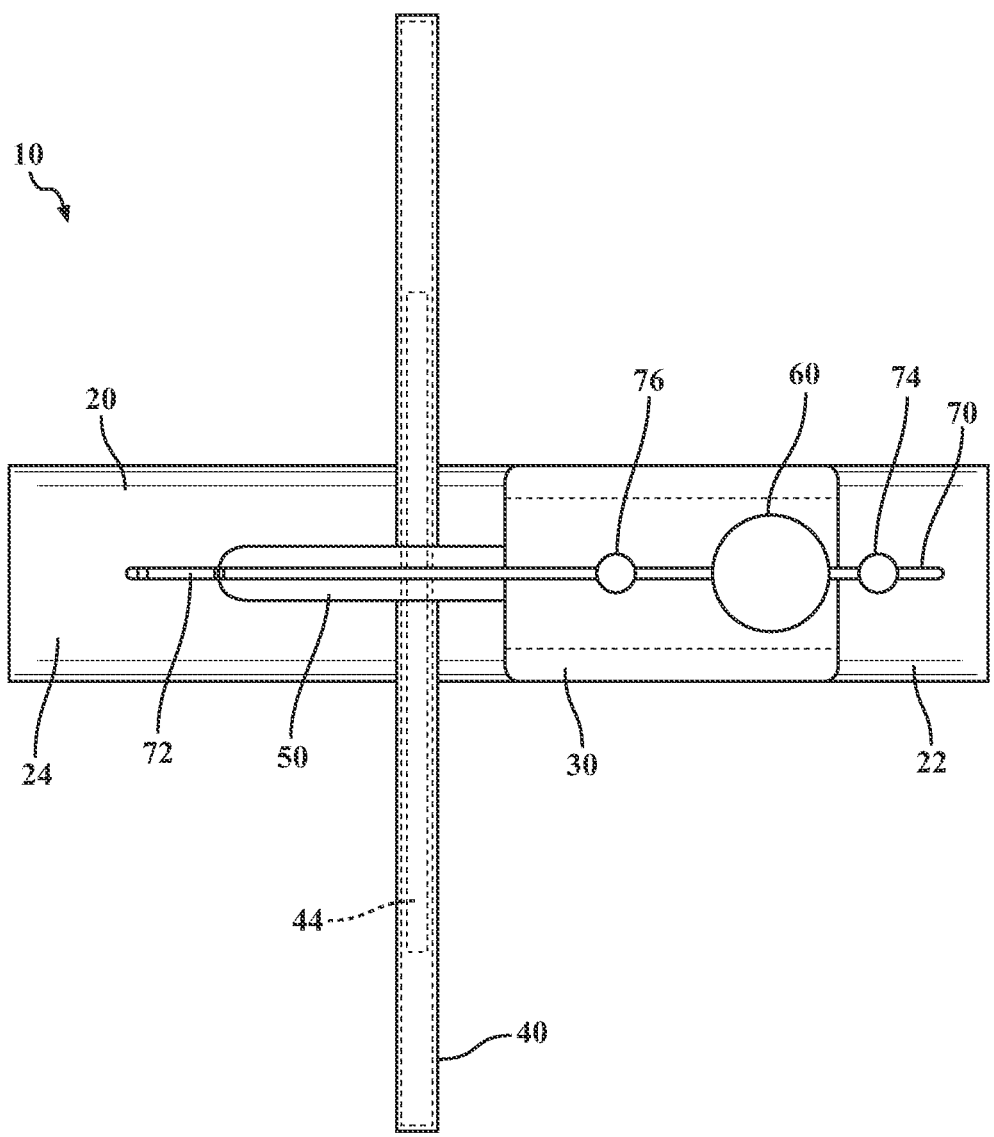
FIG. 2A schematically illustrates in top view of the system of FIG. 1A, in accordance with the present disclosure.

FIG. 2A schematically illustrates in top view of the system 10 of FIG. 1A. The system 10 is illustrated including the pipeline 20, the low-pressure chamber 30, the flow restrictor housing 40, the low-pressure tube 50, and the flapper control cylinder 60. The pipeline 20 is illustrated including the upstream portion 22 and the downstream portion 24. The tap line 70 is illustrated including the valve 74. The exit line 72 is illustrated including the valve 76.

Figure 2B:
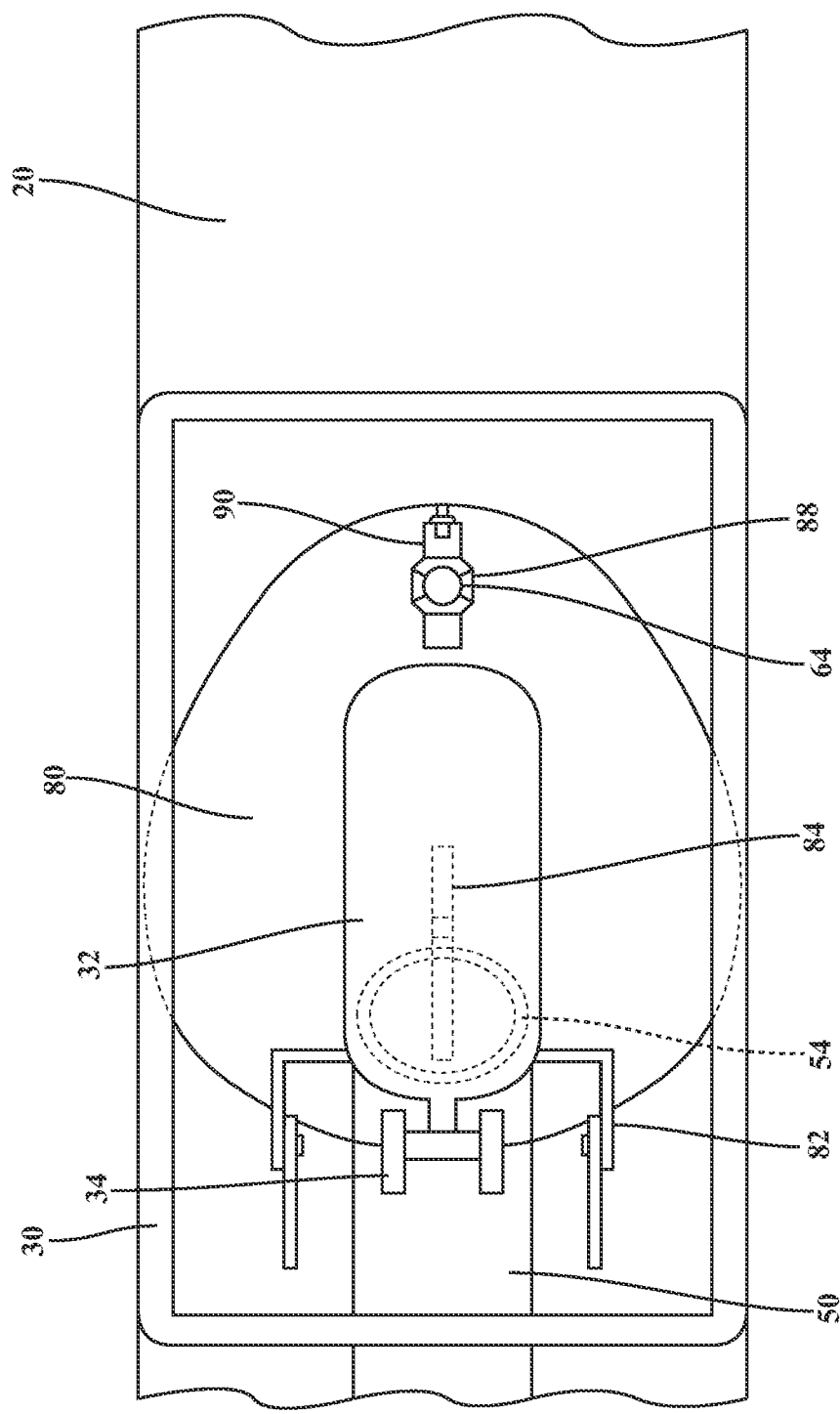
FIG. 2B schematically illustrates in top view of the low-pressure chamber of FIG. 2A in cross-section, in accordance with the present disclosure.

FIG. 2B schematically illustrates in top view of the low-pressure chamber 30 of the system of FIG. 2A in top view in cross-section. The low-pressure chamber 30 is illustrated disposed upon the pipeline 20. The low-pressure chamber 30 is illustrated including the low-pressure tub 50 including opening 54. The low-pressure chamber 30 is illustrated including the secondary flapper 32 configured to pivot about the hinge 34 and selectively block the opening 54. The primary flapper 80 is illustrated configured to pivot about the hinge 82 and further is illustrated including the latch-force receiver 88 configured to receive force from the probe 64 and be selectively latched in place by the latch device 90. The latch device 90 may be an electronically operable solenoid. In another embodiment, the latch device 90 may be hydraulically, pneumatically, magnetically, manually, or otherwise operated to selectively latch and retain in place the latch-force receiver 88. The latch device 90 may be operated as part of a pigging program or routine, may be activated based upon as sensor detecting presence or approach of a pigging device, may be operated as part of an initialization program or routine, and/or may be manually actuated by a user.

Figure 3A:
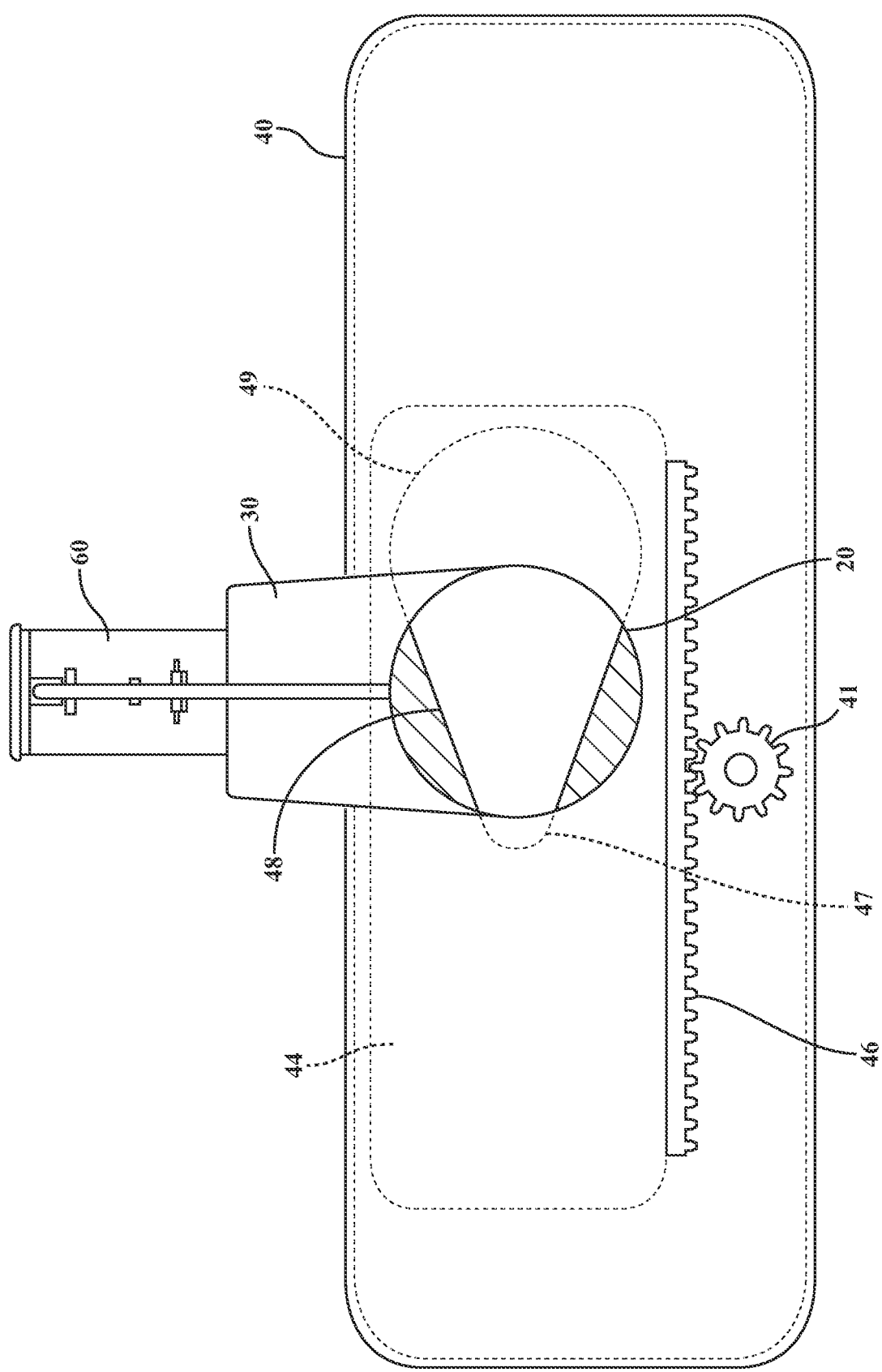
FIG. 3A schematically illustrates in front view of the system of FIG. 1A, wherein the restrictor panel is in a partially restricted position corresponding to the system being in the operational state, in accordance with the present disclosure.

FIG. 3A schematically illustrates in front view of the system 10 of FIG. 1A, wherein the restrictor panel 44 is in a partially restricted position corresponding to the system 10 being in the operational state. The pipeline 20, the low-pressure chamber 30, and the flapper control cylinder 60 are illustrated. The restrictor panel 44 is illustrated including a teardrop-shaped through-hole opening 48. The teardrop-shaped through-hole opening 48 includes a first end 49 including a circular shape which, when aligned to the pipeline 20 provides little or no additional flow resistance as compared to a similar portion of the pipeline 20. The teardrop-shaped through-hole opening 48 further includes a second end 47 that tapers down to a smaller width than the first end 49, such that, when the second end 47 is aligned with the pipeline 20, the teardrop-shaped through-hole opening 48 presents an orifice or a stepped-down cross section as compared to the diameter of the pipeline 20. In the embodiment of FIG. 3A, the restrictor panel 44 is illustrated exposing a portion of the teardrop-shaped through-hole opening 48 between the first end 49 and the second end 47. A flow resistance provided by the restrictor panel 44 upon material flowing through the pipeline 20 may be adjusted or calibrated based upon desired operation of the system 10. For example, if the flow resistance provided by the restrictor panel 44 is too low, the pressure differential between the upstream portion 22 of FIG. 1A and the downstream portion 24 of FIG. 1A will be too low and the primary flapper 80 may unintentionally fall. If the flow resistance provided by the restrictor panel 44 is too high, the flow rate of the material flowing through the pipeline 20 may be reduced too much, reducing the operational flow of the pipeline 20 to an unreasonably low rate. In the embodiment of FIG. 3A, two segments of the restrictor panel 44 are visible within an inner diameter of the pipeline 20, partially restricting flow of material therethrough. The position of the restrictor panel 44 in FIG. 3A may be described as a partial position or a position providing limited or controlled flow resistance in the pipeline 20.

The restrictor panel 44 is illustrated including the tooth-shaped features 46. A pinion gear 41 is illustrated engaged with the tooth-shaped features 46, such that the motor 42 of FIG. 1 attached to the pinion gear 41 may selectively move the restrictor panel 44 back and forth within the flow restrictor housing 40. The motor 42 may be directly attached to pinion gear 41, or a gear reducer may be disposed between the motor 42 and the pinion gear 41.

Figure 3B:
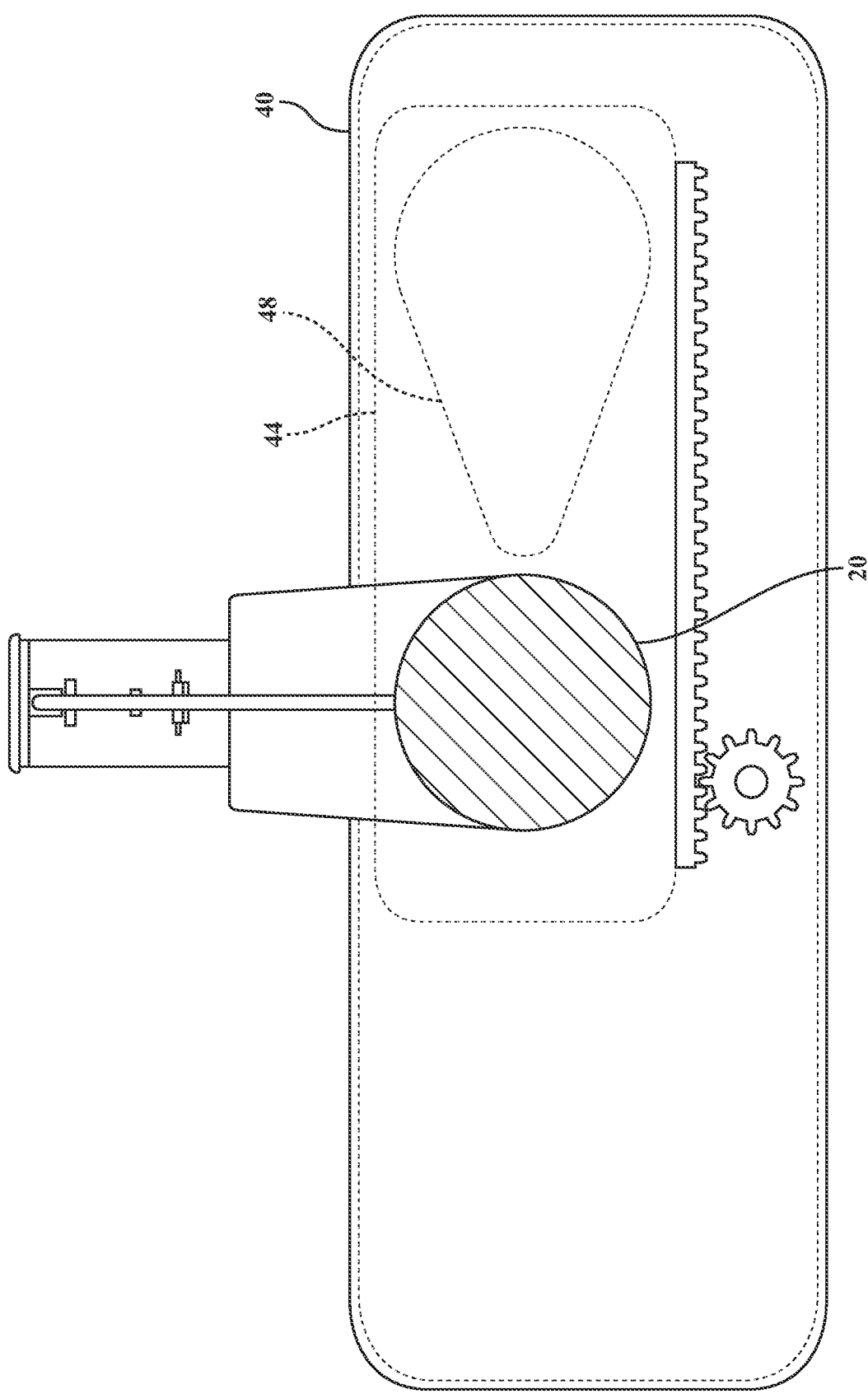
FIG. 3B schematically illustrates in front view of the system of FIG. 1A, wherein the restrictor panel is in a fully closed position corresponding to the system being in the fault state, in accordance with the present disclosure.

FIG. 3B schematically illustrates in front view of the system 10 of FIG. 1A, wherein the restrictor panel 44 within the flow restrictor housing 40 is in a fully closed position corresponding to the system 10 being in the fault state. The teardrop-shaped through-hole opening 48 may be provided upon the restrictor panel 44 such that a remaining portion of the restrictor panel 44 not including the teardrop-shaped through-hole opening 48 may fully block a flow of material through the pipeline 20. In the embodiment of FIG. 3B, the restrictor panel 44 fully blocks the pipeline 20. Upon the system 10 of FIG. 1A being triggered corresponding to a leak or rupture in the pipeline 20, the restrictor panel 44 may be moved into the position illustrated in FIG. 3B to cease or stop the flow of material through the pipeline 20. In some embodiments, the restrictor panel 44 being disposed to cease the flow of material may be redundant to the primary flapper 80 ceasing flow through the pipeline 20.

Figure 3C:
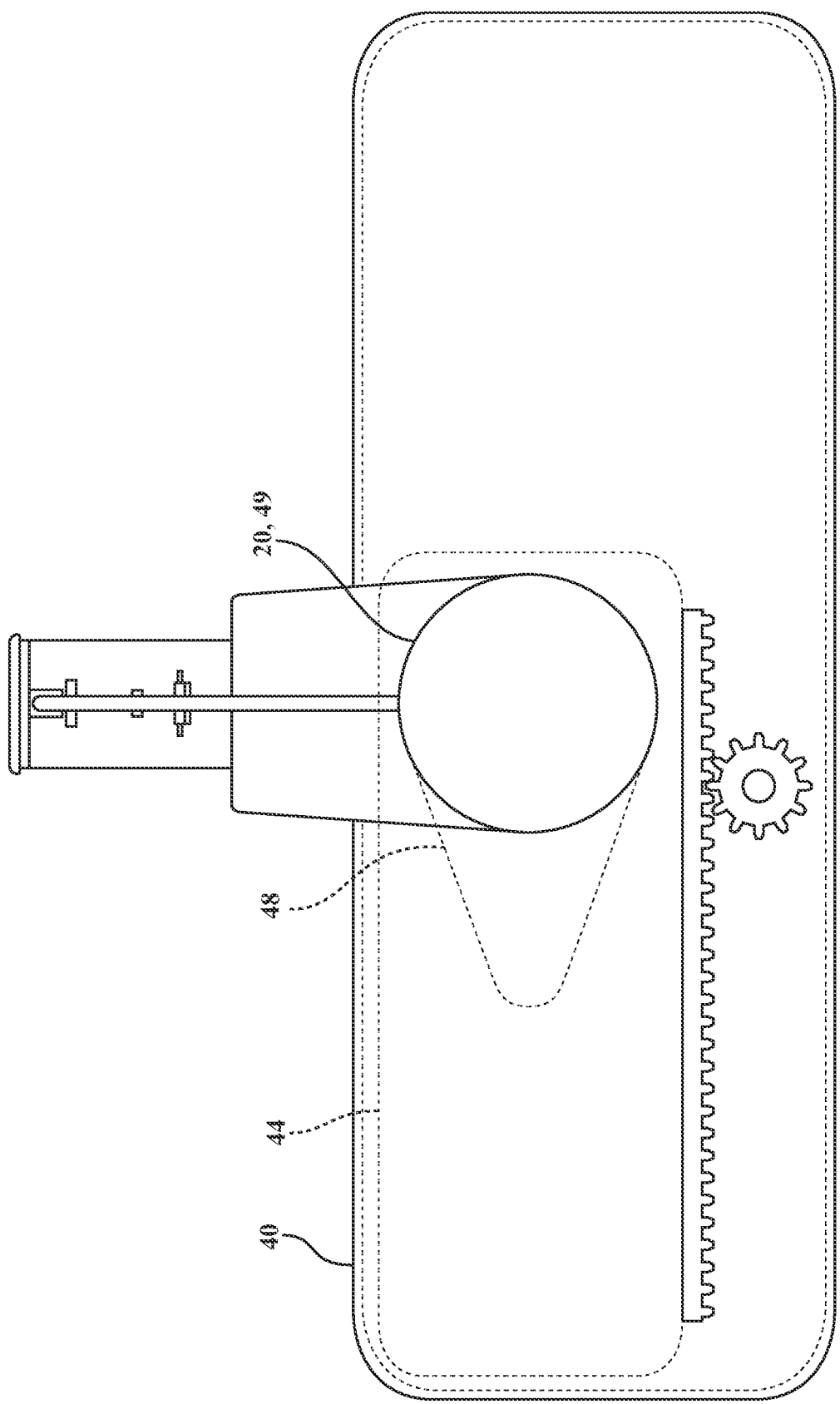
FIG. 3C schematically illustrates in front view of the system of FIG. 1A, wherein the restrictor panel is in a fully open position corresponding to the system being in a pigging operation state, in accordance with the present disclosure.

FIG. 3C schematically illustrates in front view of the system 10 of FIG. 1A, wherein the restrictor panel 44 within the flow restrictor housing 40 is in a fully open position corresponding to the system 10 being in a pigging operation state. The restrictor panel 44 is illustrated such that the teardrop-shaped through-hole opening 48 is disposed with the first end 49 being coincident to or aligned with the pipeline 20, such that no portion of the restrictor panel 44 is visible within the pipeline 20. Any pigging device that is sized to pass through the pipeline 20 is similarly sized to pass the restrictor panel in the configuration illustrated in FIG. 3C.

Figure 4:
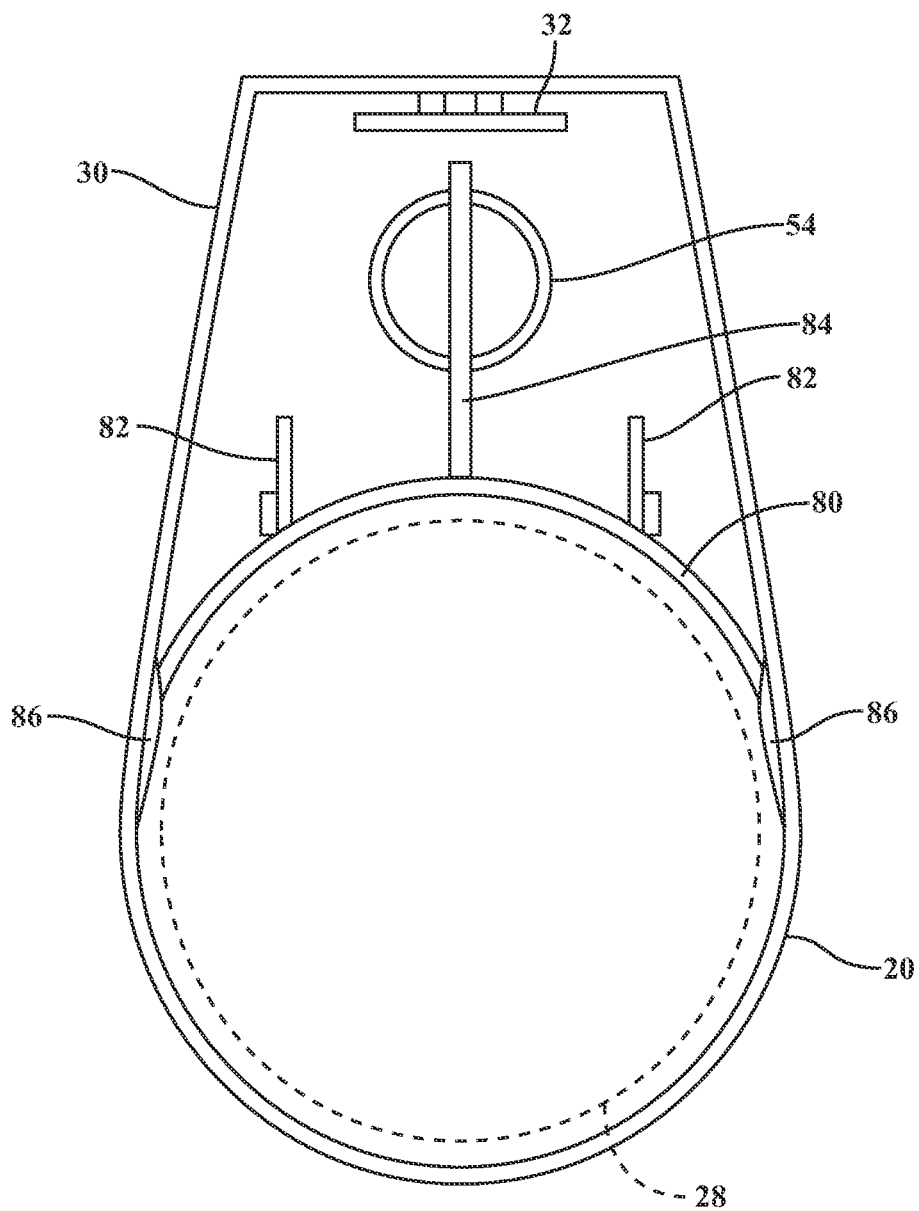
FIG. 4 schematically illustrates in front view of the system of FIG. 1A in cross-section, in accordance with the present disclosure.

FIG. 4 schematically illustrates in front view of the system 10 of FIG. 1A in cross-section. The system 10 is illustrated including the pipeline 20, the low-pressure chamber 30, and the primary flapper 80. The pipeline 20 is illustrated including a minimum piggable cross-section 28. In one embodiment, the minimum piggable cross-section 28 may be set to include an entire internal cross-section of the pipeline 20. In another embodiment, the minimum piggable cross-section 28 may be set by dimensions of a pigging device to be utilized within the pipeline 20, a minimum dimension set for the pipeline 20, or may be arbitrarily set. The primary flapper 80 is illustrated including the hinge 82 and the flexible wiper seal 86. The primary flapper 80 is illustrated in the up position, wherein the primary flapper 80 includes a shape and position similar or substantially identical to a section of the pipeline 20. The flexible wiper seal 86 is illustrated disposed between the primary flapper 80 and the pipeline 20, preventing high-pressure material within the pipeline 20 from leaking into the low-pressure chamber 30. In some embodiments, a portion of the flexible wiper seal 86 may exist or be disposed within the pipeline 20 at a smaller radius than material of the pipeline 20. This configuration may be permissible where the minimum piggable cross-section is narrower than the pipeline 20. In another embodiment, the flexible wiper seal 86 may be configured to be disposed at a radius equal to or greater than a radius of the material of the pipeline 20. In some embodiments, the pipeline 20 and/or a wall the low-pressure chamber 30 may extend outwardly away from a center of the pipeline 20 to provide extra room for the primary flapper 80 and/or the flexible wiper seal 86 in order to maintain structural features outside of the minimum piggable cross-section 28.

The cam 84 is illustrated extending upwardly from the primary flapper 80. The cam 84 prevents the secondary flapper 32 from falling down and blocking the opening 54 with the primary flapper 80 in the up position. The secondary flapper 32 is illustrated in a fully up position. In operation, the secondary flapper 32 may rest upon the cam 84.

Figure 5:
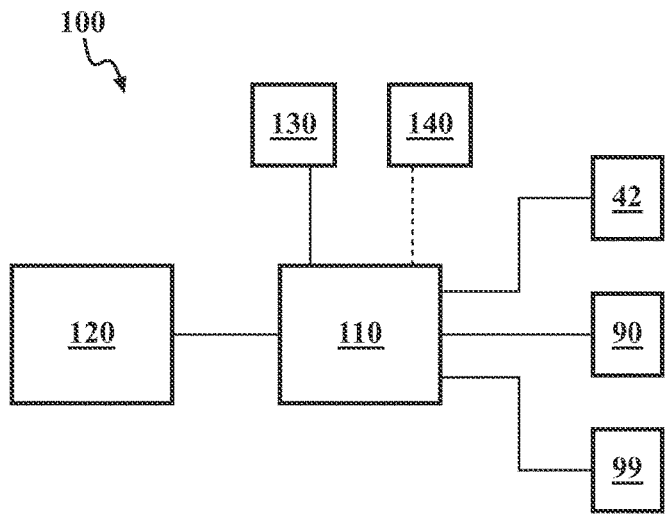
FIG. 5 schematically illustrates computerized control of the system of FIG. 1A, in accordance with the present disclosure.

FIG. 5 schematically illustrates computerized control of the system 10 of FIG. 1A. A control system 100 is illustrated including a computerized control device 110, a pigging operation controller 120, a human input device 130, and a cellular device 140. The control system 100 is further illustrated including and providing computerized control over the motor 42 and the latch device 90. The control system 100 is further illustrated receiving data from the sensor 99. The computerized control device 110 includes a processor, read-only memory (ROM), and durable memory provided for storage of programmable code. The computerized control device 110 is configured to execute the programmable code in combination with an operating system to provide computerized control of the system 10. The computerized control device 110 may receive data from the pigging operation controller 120 in order to control the system 10 in accordance with a pigging operation state. The computerized control device 110 may receive data from the human input device 130 and/or the cellular device 140 to control the system 10 in accordance with any of the states and/or calibratable features described herein.

Figure 6:
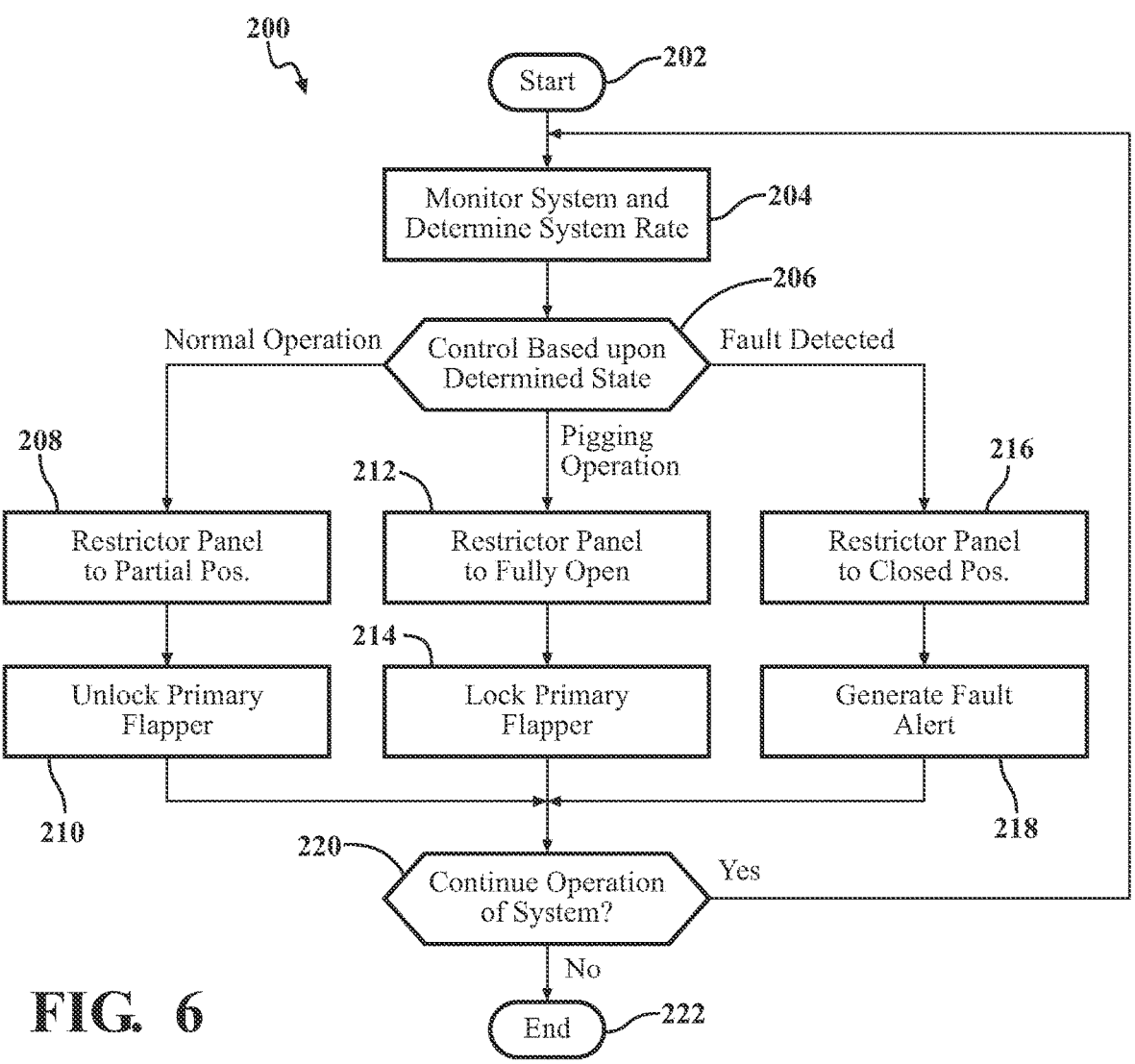
FIG. 6 is a flowchart describing a method to control the system of FIG. 1A, in accordance with the present disclosure.

FIG. 6 is a flowchart describing a method 200 to control the system 10 of FIGS. 1A, 1B, and 1C. The method 200 is illustrated describing steps which may be operable within the system 10, while the method 200 may be operated in other similar systems. The method 200 starts at step 202. At step 204, the system 10, sensors 99 located thereto, and control mechanisms are monitored, and a system state is determined. At step 206, the system state is utilized to provide control over the system 10. If the system 10 is determined to be in normal operation or in an operational state, the method 200 advances to the step 208, where the restrictor panel 44 is controlled to a partial position or a position configured for providing limited or controlled flow restriction in the pipeline 20. The method 200 then advances to step 210, wherein the latch device 90 is controlled to unlock the primary flapper 80. After execution of the steps 208 and 210, the primary flapper 80 is maintained in the up position by the pressure differential created by the orifice provided by the partial position of the restrictor panel 44, the latch device 90 is disengaged and does not hold the primary flapper 80 in place, and the system 10 is prepared to react to a leak or rupture in the pipeline 20.

When, in step 206, it is determined that the system 10 is to be configured for a pigging operation or in a pigging operation state, the method 200 advances to the step 212, wherein the restrictor panel 44 is moved to a fully open position. At step 214, the primary flapper 80 is locked in an up position. In some embodiments, the step 214 may occur prior to the step 212, for example, to lock the primary flapper 80 in the up position prior to the restrictor panel 44 being moved into the fully open position to avoid the pressure differential being decreased prior to the latch device 90 being engaged. After executing the steps 212 and 214, the system 10 is prepared to enable a pigging device to travel through the system 10.

When, in step 206, it is determined that the system 10 is to be configured for a detected fault or in a fault state, the method 200 advances to the step 216, wherein the restrictor panel 44 is moved to a closed position. At step 218, a fault alert is generated, for example, alerting a user that a leak in the pipeline 20 has been detected. A fault alert may include an indication to the user that the primary flapper 80 is to be reset prior to the pipeline 20 returning to an operational state. At step 220, a determination is made whether the system is to continue operation. If operation is to continue, the method 200 returns to the step 204. If operation is not to continue, the method 200 advances to the step 222 where the method 200 ends. The method 200 provides one exemplary method to control operation of the system 10 of FIG. 1A. A number of additional and/or alternative method steps are envisioned, and the disclosure is not intended to be limited to the examples provided herein.

While the best modes for carrying out the disclosure have been described in detail, those familiar with the art to which this disclosure relates will recognize various alternative designs and embodiments for practicing the disclosure within the scope of the appended claims.

What is claimed is:

1. A system including a differential pressure actuated valve configured to control a flow of material through a pipeline, the system comprising:
    the pipeline configured for transporting the flow of material and including:
        an upstream portion receiving the flow of material into the pipeline; and
        a downstream portion wherein the flow of material flows from the upstream portion, through a variable flow restrictor, and into the downstream portion;
    the variable flow restrictor configured to selectively operate in one of a plurality of states of varying resistance, wherein the variable flow restrictor is further configured for providing a restrictive orifice within the pipeline and creating a pressure differential in the flow of material across the variable flow restrictor including relatively high-pressure material in the upstream portion and relatively low-pressure material in the downstream portion, and wherein the relatively low-pressure material includes a pressure less than an ambient pressure outside of the pipeline;
a low-pressure tube connected to the downstream portion and receiving a portion of the relatively low-pressure material;
a low-pressure chamber connected to the low-pressure tube and receiving the portion of the relatively low-pressure material, wherein the low-pressure tube includes an opening within the low-pressure chamber and wherein the low-pressure chamber includes a secondary flapper configured for selectively blocking the opening;
a primary flapper including a hinge enabling the primary flapper to move between a first position and a second position, disposed between the upstream portion and the low-pressure chamber, and configured to be disposed in one of:
the first position, wherein the primary flapper separates the relatively high-pressure material in the upstream portion from the portion of the relatively low-pressure material in the low-pressure chamber, is held in the first position by the pressure differential, and enables the flow of material to flow through the pipeline; and
the second position, wherein the primary flapper spans an internal diameter of the pipeline and blocks the flow of material through the pipeline, and wherein the primary flapper is configured to move to the second position when a leak in the downstream portion causes air or water at the ambient pressure to enter the downstream portion and reduce the pressure differential.

2. The system of claim 1, wherein the variable flow restrictor being configured to selectively operate in one of the plurality of states of varying resistance includes the variable flow restrictor being configured to operate in one of a fully open state and a partially restricted state, wherein the variable flow restrictor is configured for providing the restrictive orifice.

3. The system of claim 2, wherein the primary flapper, when the primary flapper is in the first position, is configured for including a shape similar to the pipeline.

4. The system of claim 3, wherein the variable flow restrictor being in the fully open state and the primary flapper, being in the first position, are configured for enabling a pigging device configured for traveling through the pipeline to pass through the system.

5. The system of claim 4, further comprising a latch device configured to lock the primary flapper in the first position while the variable flow restrictor is in the fully open state.

6. The system of claim 4, further comprising a flapper control cylinder configured to provide a calibratable force upon the primary flapper.

7. The system of claim 1, wherein the variable flow restrictor includes:
a flow restrictor housing connected to the pipeline, wherein the flow restrictor housing is leak-proof and is configured to prevent the air or the water at the ambient pressure from entering the pipeline or the flow of material from escaping from the pipeline; and
a restrictor panel including a through-hole, wherein the restrictor panel is movable between a plurality of positions and is configured to selectively provide variable flow resistance based upon an alignment of the through-hole with the pipeline resulting from the plurality of positions.

8. The system of claim 7, wherein the restrictor panel includes a plurality of tooth-shaped features; and
wherein the variable flow restrictor further includes a motor and a pinion gear, wherein the motor provides torque to the pinion gear, and wherein the pinion gear engages with the tooth-shaped features and moves the restrictor panel between the plurality of positions.

9. The system of claim 7, wherein the through-hole includes a teardrop-shaped through-hole opening.

10. The system of claim 7, wherein the restrictor panel includes a portion without the through-hole; and
wherein the variable flow restrictor is configured for ceasing the flow of material through the pipeline by aligning the portion without the through-hole with the pipeline.

11. The system of claim 1, wherein the primary flapper includes a cam extending upwardly from the primary flapper; and
wherein the cam is configured to keep the secondary flapper from blocking the opening when the primary flapper is in the first position.

12. The system of claim 1, wherein the primary flapper includes a flexible wiper seal disposed around a perimeter of the primary flapper;
wherein, when the primary flapper is in the first position, the flexible wiper seal is configured for preventing the relatively high-pressure material in the upstream portion from leaking past the primary flapper into the low-pressure chamber; and
wherein, when the primary flapper is in the second position, the flexible wiper seal is configured for sealing the primary flapper to an inner diameter of the pipeline.

13. The system of claim 1, wherein the first position is an up position; and
wherein the second position is a fallen position.

14. A system including a differential pressure actuated valve configured to control a flow of material through a pipeline and to enable a pigging device to pass through the system, the system comprising:
the pipeline configured for transporting the flow of material and including:
an upstream portion receiving the flow of material into the pipeline; and
a downstream portion wherein the flow of material flows from the upstream portion, through a variable flow restrictor, and into the downstream portion;
the variable flow restrictor configured to selectively operate in one of a fully open state and a partially restricted state, wherein the variable flow restrictor is further configured for providing a restrictive orifice within the pipeline and creating a pressure differential in the flow of material across the variable flow restrictor including relatively high-pressure material in the upstream portion and relatively low-pressure material in the downstream portion, and wherein the relatively low-pressure material includes a pressure less than an ambient pressure outside of the pipeline;
a low-pressure tube connected to the downstream portion and receiving a portion of the relatively low-pressure material;
a low-pressure chamber connected to the low-pressure tube and receiving the portion of the relatively low-pressure material, wherein the low-pressure tube includes an opening within the low-pressure chamber and wherein the low-pressure chamber includes a secondary flapper configured for selectively blocking the opening;

a primary flapper including a hinge enabling the primary flapper to move between an up position and a fallen position, disposed between the upstream portion and the low-pressure chamber, and configured to be disposed in one of:

the up position, wherein the primary flapper separates the relatively high-pressure material in the upstream portion from the portion of the relatively low-pressure material in the low-pressure chamber, is held in the up position by the pressure differential, and enables the flow of material to flow through the pipeline, and wherein the primary flapper, when the primary flapper is in the up position, is configured for including a shape similar to the pipeline; and the fallen position, wherein the primary flapper spans an internal diameter of the pipeline and blocks the flow of material through the pipeline, and wherein the primary flapper is configured to move to the fallen position when a leak in the downstream portion causes air or water at the ambient pressure to enter the downstream portion and reduce the pressure differential; and wherein the variable flow restrictor being in the fully open state and the primary flapper, being in the up position, are configured for enabling the pigging device configured for traveling through the pipeline to pass through the system.

15. The system of claim 14, wherein the variable flow restrictor is further configured to operate in a plurality of partially restricted states to enable adjustment of the pressure differential.

16. The system of claim 15, further comprising a latch device configured to lock the primary flapper in the up position while the variable flow restrictor is in the fully open state.

17. The system of claim 15, further comprising a flapper control cylinder configured to provide a calibratable force upon the primary flapper.

18. The system of claim 14, wherein the variable flow restrictor includes:

a flow restrictor housing connected to the pipeline, wherein the flow restrictor housing is leak-proof and is configured to prevent the air or the water at the ambient pressure from entering the pipeline or the flow of material from escaping from the pipeline; and a restrictor panel including a through-hole, wherein the restrictor panel is movable between a plurality of positions and is configured to selectively provide variable flow resistance based upon an alignment of the through-hole with the pipeline resulting from the plurality of positions.

19. The system of claim 18, wherein the through-hole includes a teardrop-shaped through-hole opening.

20. The system of claim 18, wherein the restrictor panel includes a portion without the through-hole; and wherein the variable flow restrictor is configured for ceasing the flow of material through the pipeline by aligning the portion without the through-hole with the pipeline.

* * * * *